United States Patent
Tsuda et al.

(10) Patent No.: US 9,815,455 B2
(45) Date of Patent: Nov. 14, 2017

(54) CONTROL DEVICE FOR VEHICLE DRIVE DEVICE

(71) Applicant: AISIN AW CO., LTD., Anjo-shi, Aichi-ken (JP)

(72) Inventors: Kohei Tsuda, Nishio (JP); Tomohiro Onouchi, Anjo (JP); Keiichirou Kusabe, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/432,309

(22) PCT Filed: Oct. 4, 2013

(86) PCT No.: PCT/JP2013/077185
§ 371 (c)(1),
(2) Date: Mar. 30, 2015

(87) PCT Pub. No.: WO2014/054813
PCT Pub. Date: Apr. 10, 2014

(65) Prior Publication Data
US 2015/0274154 A1    Oct. 1, 2015

(30) Foreign Application Priority Data

Oct. 5, 2012 (JP) .................................. 2012-223650
Jan. 18, 2013 (JP) .................................. 2013-007157

(51) Int. Cl.
*B60W 20/00*    (2016.01)
*F16H 61/16*    (2006.01)
(Continued)

(52) U.S. Cl.
CPC ............ *B60W 20/30* (2013.01); *B60W 20/11* (2016.01); *B60W 20/14* (2016.01);
(Continued)

(58) Field of Classification Search
CPC ...... B60W 20/10; B60W 20/11; B60W 20/14; B60W 20/15; B60W 20/30; B60W 20/40;
(Continued)

(56) References Cited

U.S. PATENT DOCUMENTS

| 2005/0059529 A1 | 3/2005 | Sakamoto et al. |
| 2008/0064565 A1* | 3/2008 | Doi .................. F16H 61/16 |
| | | 477/75 |

(Continued)

FOREIGN PATENT DOCUMENTS

| CN | 101445039 A | 6/2009 |
| JP | 2005-090308 A | 4/2005 |

(Continued)

OTHER PUBLICATIONS

Regenerative Braking, Accessed Jan. 5, 2017, The Clemson University Vehicular Electronics Laboratory, http://www.cvel.clemson.edu/auto/systems/regenerative_braking.html.*

(Continued)

*Primary Examiner* — Spencer D Patton
(74) *Attorney, Agent, or Firm* — Oliff PLC

(57) ABSTRACT

A control device for a vehicle drive device having a speed change mechanism that attains a predetermined shift speed by engaging multiple engagement elements. The control device predicts an amount of heat generation and determines whether any jumping shift from the current shift speed to the shift speed that is the multiple shift speeds higher or lower than the current shift speed can be permitted or not between the current shift speed and the target shift speed, and if the jumping shift can be permitted, the control unit performs the jumping shift and controls the speed change mechanism so as to shift the shift speed from the current shift speed to the target shift speed.

9 Claims, 11 Drawing Sheets

(51) Int. Cl.
  *B60W 20/30* (2016.01)
  *B60W 30/186* (2012.01)
  *F16H 59/72* (2006.01)
  *B60W 20/11* (2016.01)
  *B60W 20/14* (2016.01)
  *F16H 61/21* (2006.01)
  *B60W 10/115* (2012.01)
  *B60K 6/48* (2007.10)

(52) U.S. Cl.
  CPC ........... *B60W 30/186* (2013.01); *F16H 59/72* (2013.01); *F16H 61/16* (2013.01); *B60K 2006/4825* (2013.01); *B60W 10/115* (2013.01); *B60W 2710/1005* (2013.01); *F16H 61/21* (2013.01); *F16H 2059/725* (2013.01); *F16H 2306/14* (2013.01); *Y02T 10/6252* (2013.01); *Y10S 903/945* (2013.01)

(58) Field of Classification Search
  CPC  B60W 30/186; F16H 59/75; F16H 2059/725; F16H 61/16; Y02T 10/6252; Y10S 903/945
  See application file for complete search history.

(56) References Cited

U.S. PATENT DOCUMENTS

| | | |
|---|---|---|
| 2008/0220933 A1 | 9/2008 | Maeda |
| 2009/0143189 A1 | 6/2009 | Hasegawa et al. |
| 2011/0239801 A1 | 10/2011 | Inagaki et al. |
| 2012/0265382 A1* | 10/2012 | Nefcy .................. B60W 10/06 701/22 |
| 2016/0069453 A1* | 3/2016 | Atmaram ............... F16H 59/46 192/3.61 |

FOREIGN PATENT DOCUMENTS

| | | |
|---|---|---|
| JP | 2007-263172 A | 10/2007 |
| JP | 2008-032191 A | 2/2008 |
| JP | 2008-094253 A | 4/2008 |
| JP | 2008-221879 A | 9/2008 |
| JP | 2011-213252 A | 10/2011 |

OTHER PUBLICATIONS

Jan. 14, 2014 International Search Report issued in International Application No. PCT/JP2013/077185.

* cited by examiner

FIG. 3

|      | K0  | C1 | C2 | C3 | B1 | B2  |
|------|-----|----|----|----|----|-----|
| Rth  | (O) |    |    | O  |    | O   |
| 1st  | (O) | O  |    |    |    | (●) |
| 2nd  | (O) | O  |    |    | O  |     |
| 3rd  | (O) | O  |    | O  |    |     |
| 4th  | (O) | O  | O  |    |    |     |
| 5th  | (O) |    | O  | O  |    |     |
| 6th  | (O) |    | O  |    | O  |     |

O  ENGAGE (O) ENGAGE IN HV DRIVE MODE (* INCLUDING SLIP STATE)

(●) ENGAGE ONLY WHEN ENGINE BRAKE IS IN OPERATION

| CURRENT GEAR SPEED (NowGear) | GEAR SPEED AFTER SHIFTING (TargetGear) | | | | | |
|---|---|---|---|---|---|---|
| | 1st | 2nd | 3rd | 4th | 5th | 6th |
| 1st | | | | | | |
| 2nd | | | | | | |
| 3rd | 3-1 DETER-MINATION | | | | | |
| 4th | 4-1 DETER-MINATION | 4-2 DETER-MINATION | | | | |
| 5th | 5-1 DETER-MINATION | 5-2 DETER-MINATION | 5-3 DETER-MINATION | | | |
| 6th | 6-1 DETER-MINATION | 6-2 DETER-MINATION | 6-3 DETER-MINATION | 6-4 DETER-MINATION | | |

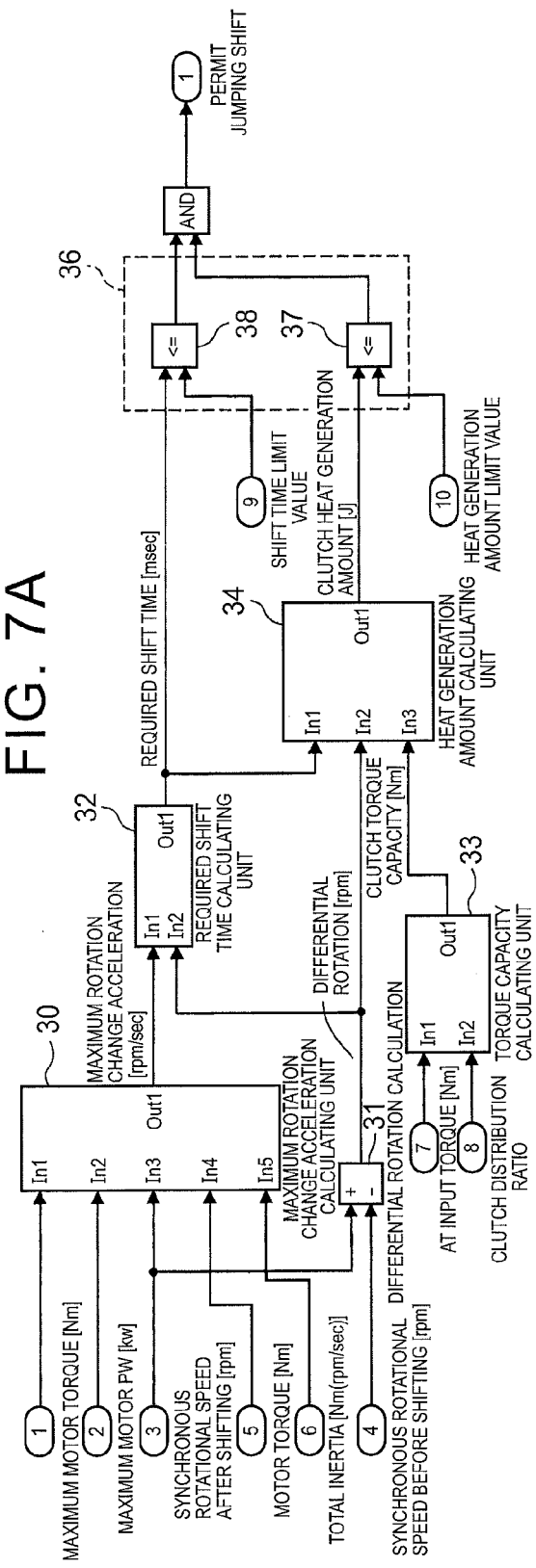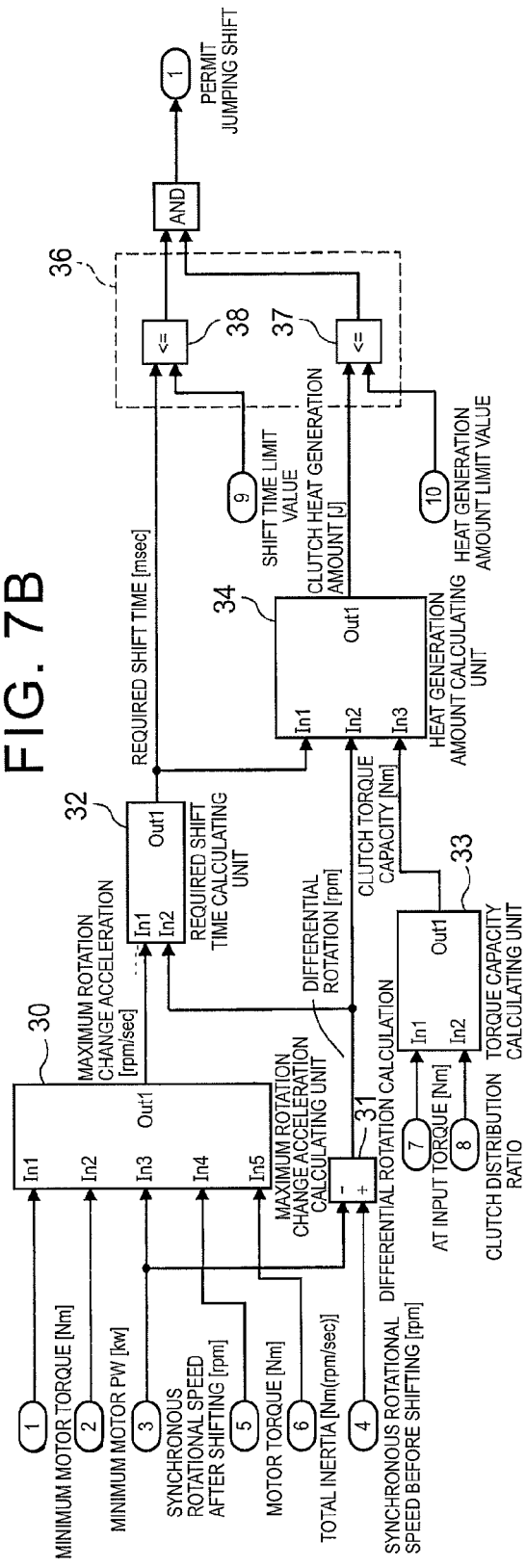

FIG. 10A
FIG. 10B
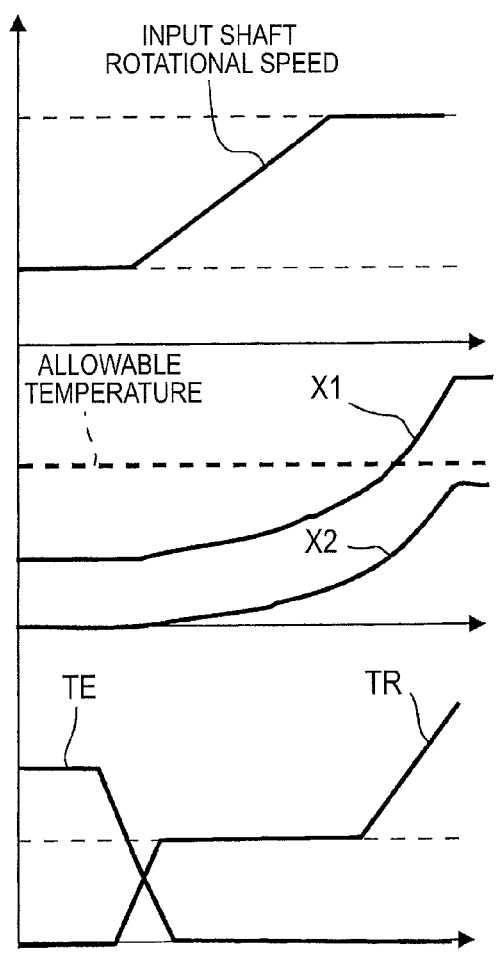
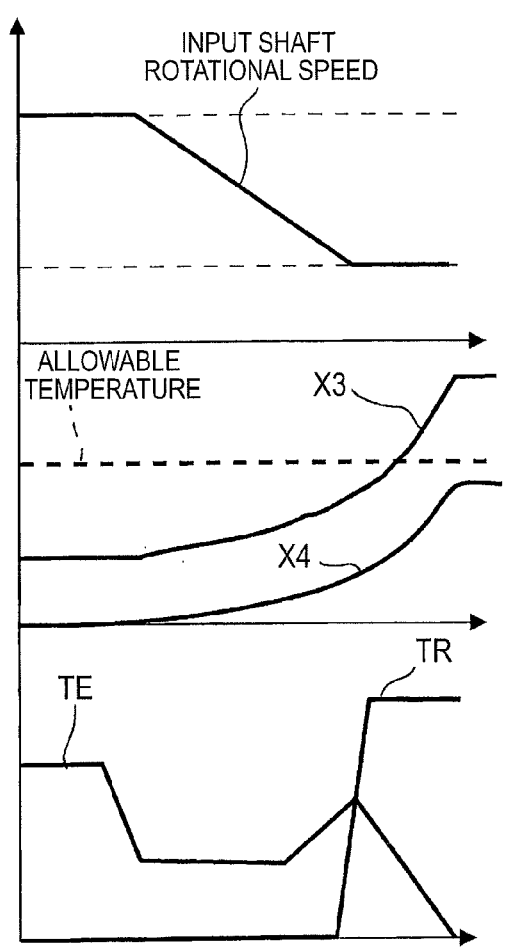

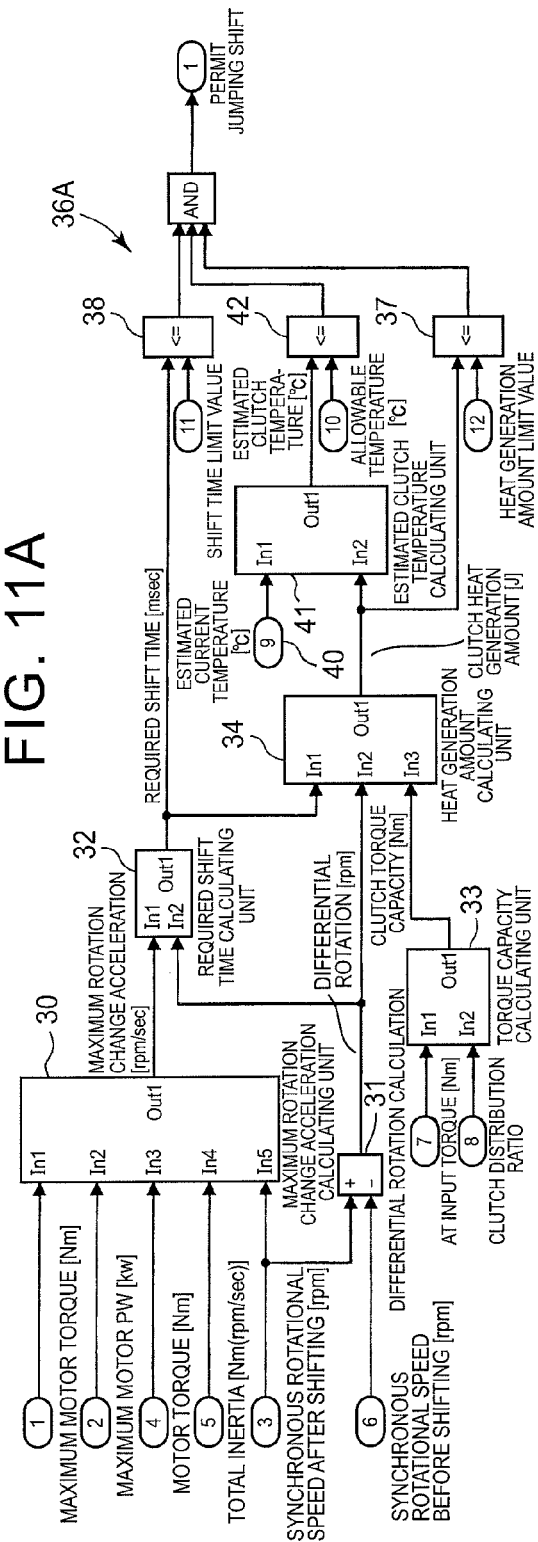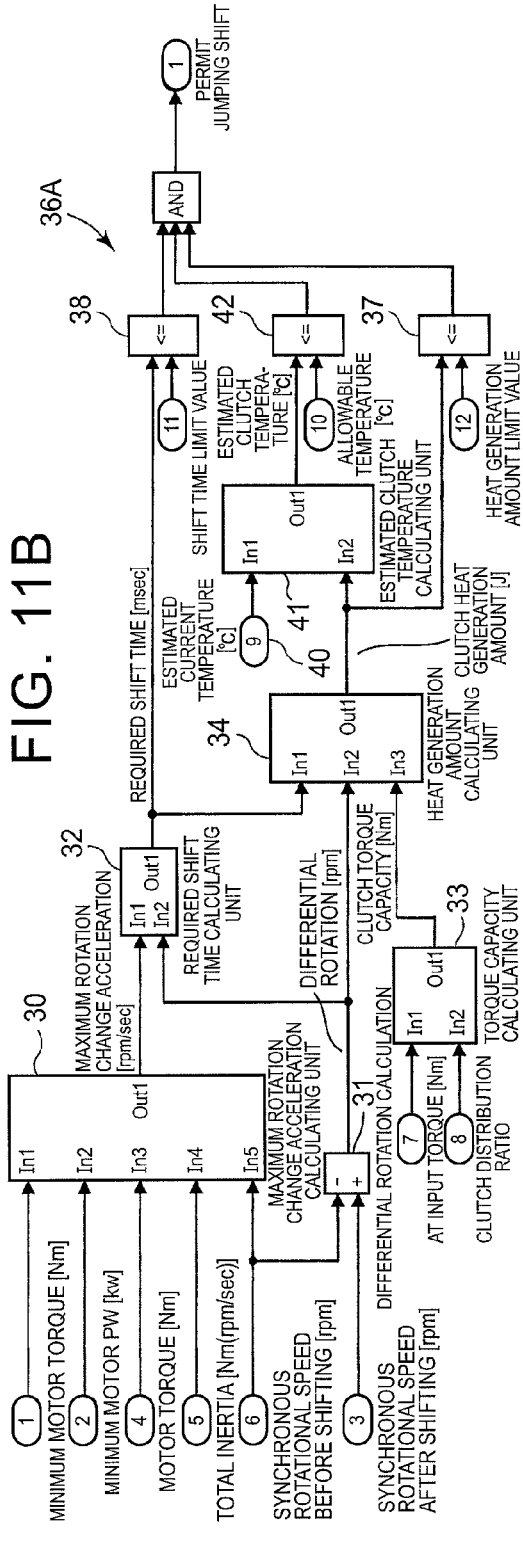

CONTROL DEVICE FOR VEHICLE DRIVE DEVICE

TECHNICAL FIELD

Preferred embodiments relate to control devices for vehicle control devices in which a rotating electrical machine is provided on the input side of a speed change mechanism.

BACKGROUND ART

In recent years, as represented by, e.g., vehicles such as hybrid vehicles and electric vehicles, vehicles have been increasingly developed which include a rotating electrical machine as a driving source and have energy efficiency enhanced by converting kinetic energy of the vehicle to electrical energy and collecting the electrical energy by regeneration of the rotating electrical machine.

For example, Japanese Patent Application Publication No. 2008-94253 (JP 2008-94253 A) describes a hybrid vehicle having a rotating electrical machine (motor generator) provided between an engine and a stepped automatic transmission, in which a jumping downshift of the stepped automatic transmission is performed to cause regeneration of the rotating electrical machine at a high rotational speed so that a sufficient regeneration amount is obtained by the rotating electrical machine.

Japanese Patent Application Publication No. 2011-213252 (JP 2011-213252 A) describes that, during power-off shifting, an engagement element to be disengaged is slip-engaged to cause regeneration by a rotating electrical machine.

SUMMARY

Problem to be Solved

The hybrid vehicle described in JP 2008-94253 A prohibits regeneration by the rotating electrical machine during the jumping downshift, and ensures deceleration during shifting by a friction brake. Accordingly, kinetic energy during the shifting cannot be collected, which reduces energy efficiency.

One solution to the above problem is to perform shifting while, causing regeneration by slip engagement of an engagement element associated with the shifting, as in the hybrid vehicle described in JP 2011-213252 A. In this case, however, an engagement element to be engaged is subjected to a rotation braking force in an inertia phase. A large amount of heat is therefore generated during the slip engagement. Moreover, in the case of a jumping shift, the amount of heat generation of the engagement element is increased due to a large difference between the rotational speed of an input shaft of an automatic transmission before shifting and that after the shifting, and a longer shift time as compared to a normal downshift.

It is sometimes desired to perform a jumping upshift while ensuring a braking force, such as, e.g., in the case where a brake pedal is depressed with an accelerator pedal being released from a depressed state. In this case as well, it is desired in view of energy efficiency to cause regeneration of the rotating electrical machine while applying a braking force to the vehicle by the regeneration of the rotating electrical machine, as described in JP 2011-213252 A. In the jumping shift, however, the time required for shifting is long, and a large amount of heat is generated in the engagement element to be disengaged as it is subjected to a rotation braking force even in the inertia phase.

It is an object of preferred embodiments to provide a control device that improves energy efficiency of a vehicle drive device by efficiently causing regeneration of a rotating electrical machine without causing excessive heat generation of an engagement element.

Means for Solving the Problem

According to preferred embodiments, a control device for a vehicle drive device having a speed change mechanism that attains a predetermined shift speed by engaging multiple engagement elements, the control device controlling the speed change mechanism so that when performing shifting of the speed change mechanism in a regenerating state where regeneration is performed by a rotating electrical machine provided on an input side of the speed change mechanism, the shifting of the speed change mechanism is performed while maintaining a state where a regenerative braking force of the rotating electrical machine can be transmitted, in that if the shifting of the speed change mechanism is to be performed in the regenerating state, and a target shift speed after the shifting is as plurality of shift speeds higher or lower than a current shift speed, the control device predicts an amount of heat generation of the engagement element that has been engaged at the current shift speed and is to be disengaged at the shift speed after the shifting or the engagement element that has been disengaged at the current shift speed and is to be engaged at the shift speed after the shifting, and determines based on the amount of heat generation whether any jumping shift from the current shift speed to the shift speed that is the multiple shift speeds higher or lower than the current shift speed can be permitted or not between the current shift speed and the target shift speed, and if the jumping shift can be permitted, the control unit performs the jumping shift and controls the speed change mechanism so as to shift the shift speed from the current shift speed to the target shift speed.

This allows the control device not to perform any jumping shift that cannot be permitted due to a large amount of heat generation of the engagement element, but to perform only a jumping shift with an acceptable amount of heat generation. This can prevent a thermal load on the engagement element whose engagement/disengagement state is to be changed for the shifting from becoming excessive, and can reduce the number of shifts by performing as many jumping shifts as possible and can thus reduce energy loss during the shifting. Moreover, since regeneration by the rotating electrical machine can be performed in an efficient rotational speed range at an early point in time, energy efficiency of the vehicle drive device can be improved.

It is preferable that the amount of heat generation be predicted based on the regenerative braking force.

It is also preferable that if the amount of heat generation is equal to or smaller than a heat generation amount limit value that has been set for each engagement element (C-1 to C-3, B-1, B-2, F-1), the control device determine that the jumping shift can be permitted, and if the amount of heat generation is larger than the heat generation amount limit value, the control device do not permit the jumping shift.

As described above, the heat generation amount limit value is set for each engagement element, and it is determined whether the predicted amount of heat generation of the engagement element whose engagement/disengagement state is to be changed is larger than the heat generation amount limit value or not. Accordingly, it can be easily determined based on the amount of heat generation during one shifting whether the jumping shift can be performed or not.

It is also preferable that the control device compute based on a heat balance accumulated up until the shifting is performed a current temperature of the engagement element whose amount of heat generation is predicted, and obtain based on the computed current temperature and the amount of heat generation an estimated temperature during shifting of the engagement element whose amount of heat generation is predicted, and if the estimated temperature is equal to or lower than an allowable temperature that has been set for each engagement element, the control device determine that the jumping shift can be permitted, and if the estimated temperature is higher than the allowable temperature, the control device do not permit the jumping shift.

As described above, the estimated temperature is obtained in view of the current temperature of the engagement element computed based on the heat balance accumulated up until the shifting is performed. Accordingly, the temperature of the engagement element during the shifting can be accurately estimated, and whether the jumping shift can be performed or not can be accurately determined.

It is also preferable that the control device for the vehicle drive device obtain maximum rotation change acceleration that can be given to the speed change mechanism by the rotating electrical machine, and obtain a time required for the shifting from the maximum rotation change acceleration and a difference between a rotational speed of the speed change mechanism before the shifting and that after the shifting, and if the required time is longer than a predetermined limit shift time, the control device do not permit the computed shift.

As described above, if the time required for the jumping shift is longer than the predetermined limit shift time, the control device does not permit the computed jumping shift. This can prevent degradation in drivability due to a long shift time.

It is also preferable that if there are a plurality of the jumping shifts that can be permitted, the control device for the vehicle drive device perform the jumping shift having a largest difference in shift speed between the current shift speed and a shift speed after the jumping shift out of the plurality of jumping shifts that can be permitted.

As described above, if there are a plurality of the jumping shifts that can be permitted, the control device performs the jumping shift having the largest difference in shift speed. The shifting to the target shift speed can thus be quickly achieved in a small number of shifts.

It is also preferable that when determining whether the jumping shifts can be permitted or not, the control device for the vehicle drive device first determine whether the jumping shift from the current shift speed directly to the target shift speed can be permitted or not, and then determine whether the jumping shifts can be permitted or not by reducing the difference in shift speed between the current shift speed and the shift speed after the jumping shift one by one, and the first jumping shift determined to be able to be permitted be the jumping shift having the largest difference in shift speed between the current shift speed and the shift speed after the jumping shift.

As described above, whether the jumping shift can be permitted or not is determined by reducing the difference in shift speed one by one from the difference in shift speed in the jumping shift in which the shift speed is shifted from the current shift speed directly to the target shift speed. It can therefore be reliably and easily determined that the lint jumping shift that can be permitted is the jumping shift having the largest difference in shift speed.

It is also preferable that if the jumping shift is a jumping shift that is performed by changing an engagement/disengagement state of one engagement element forming the current shift speed, the control device for the vehicle drive device calculate the amount of heat generation of the engagement element (e.g., C-1 in the case of 6-2 shift) that is caused to have a torque capacity corresponding to the regenerative braking force when the engagement/disengagement state of the one engagement element is changed, and permit the jumping shift if it can be determined from the calculated amount of heat generation that the engagement/disengagement state of the one engagement element can be changed.

Whether the shift can be permitted or not can thus be reliably determined based on the amount of heat generation of the engagement element that generates an increased amount of heat.

It is also preferable that if the jumping shift is a jumping shift that is performed by changing the engagement/disengagement states of both of two engagement elements forming the current shift speed, the control device for the vehicle drive device calculate the amount of heat generation of each engagement element (e.g., C-1 and B-2 in the case of 6-1 shift) that is caused to have the torque capacity corresponding to the regenerative braking force when the engagement/disengagement state of each of the two engagement elements is changed, and permit the jumping shift if it can be determined from the calculated amounts of heat generation that the engagement/disengagement states of both of the two engagement elements can be changed.

Whether the shift can be permitted or not can thus be reliably determined even if the shift is a jumping shift that is performed by changing the engagement/disengagement states of both of the two engagement elements forming the current shift speed.

It is also preferable that if the jumping shift is an upshift, the engagement element that is caused to have the torque capacity corresponding to the regenerative braking force be the engagement element to be disengaged (e.g., C-1 and B-2 in the case of 1-6 shift), and if the jumping shift is a downshift, the engagement element that is caused to have the torque capacity corresponding to the regenerative braking force be the engagement element to be engaged (C-1 and 3-2 in the case of 6-1 shift).

Whether the shift can be permitted or not can thus be reliably determined based on the amount of beat generation of the engagement element that generates a large amount of heat during the shifting so as to have a torque capacity large enough to transmit the regenerative braking force.

It is also preferable that the control device for the vehicle drive device calculate the amount of heat generation based on the time required for the shifting, the difference between the rotational speed of the speed change mechanism before the shifting and that after the shifting, and a torque capacity of the engagement element (C-1 to C-3, B-1, B-2, F-1).

The reference characters in the parentheses are shown for reference to the drawings. These reference characters are given for convenience to facilitate understanding, of the invention, and do not affect the configurations described in the claims in any way.

BRIEF DESCRIPTION OF THE DRAWINGS

FIG. 3 is an engagement table of a speed change mechanism of the hybrid drive device in FIG. 2.

FIG. 5A shows the ease of a regenerative downshift, and FIG. 5B shows the case of a regenerative upshift.

FIG. 7A is a diagram showing a method for determining whether a jumping shift can be, performed or not according to the first embodiment, and FIG. 7B is a diagram showing a computation method that is used to determine whether a jumping shift can be performed or not when an upshift according to the first embodiment is performed.

FIGS. 10A and 10B show graphs illustrating the difference in estimated temperature of the friction engagement element during shifting due to the difference in current temperature of the friction engagement element at the start of the shifting, where FIG. 10A shows the ease of a downshift, and FIG. 10B shows the case of an upshift.

FIG. 11A is a diagram showing a method for determining whether a jumping shift can be performed or not according to a second embodiment, and FIG. 11B is a diagram showing a computation method that is used to determine whether a jumping shift can be performed or not when an upshift according to the second embodiment is performed.

DETAILED DESCRIPTION

Control devices for a vehicle drive device according to preferred embodiments will be described with reference to the accompanying drawings. In the following description, the expression "drivingly coupled" refers to the state where rotary elements are coupled together so that a driving farce can be transmitted therebetween, and is used as a concept including the state where the rotary elements are coupled together so as to rotate together or the state where the rotary elements are coupled together via a clutch etc. so that a driving force can be transmitted therebetween. The term "jumping shift" means changing from a current shift speed to a shift speed that is multiple shift speeds higher or lower than the current shift speed.

<First Embodiment>
<Schematic Configuration of Hybrid Drive Device>

Figure 1:
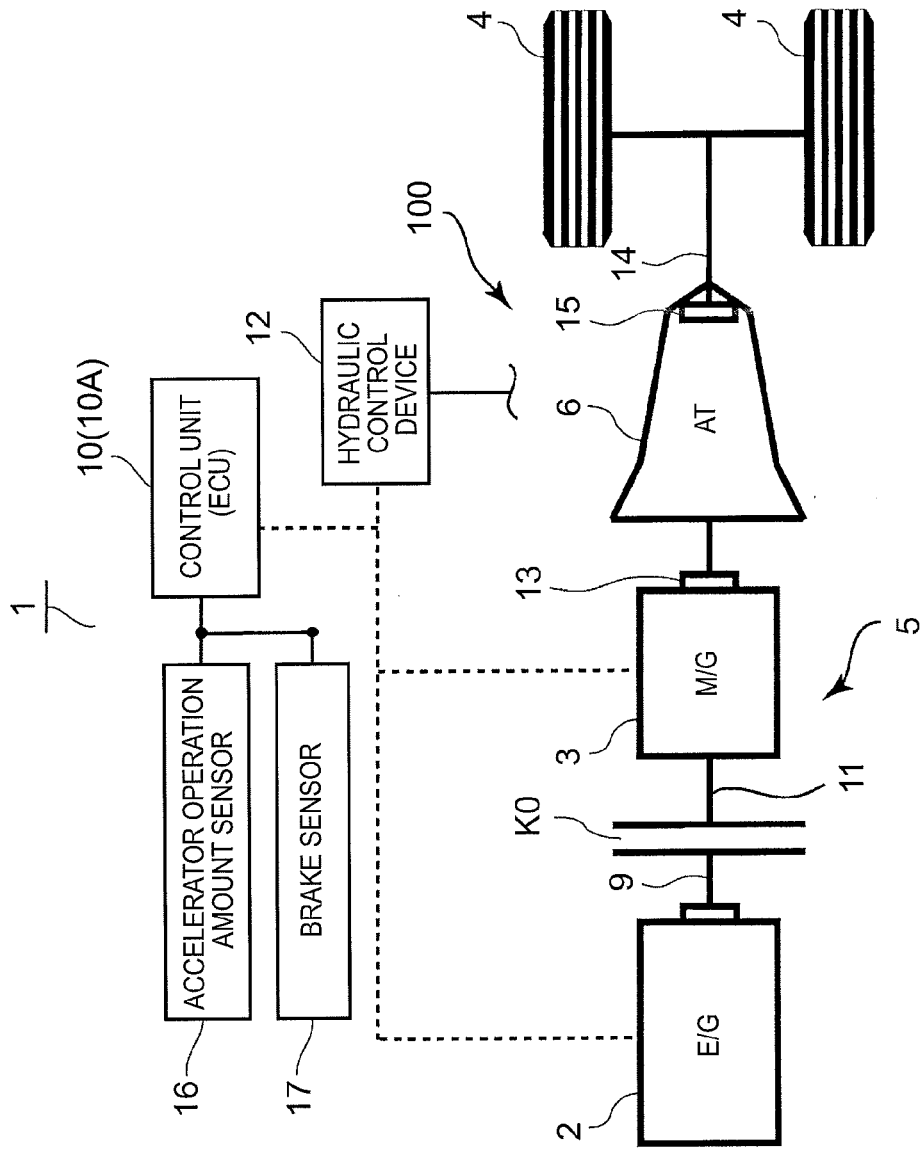
FIG. 1 is a schematic view showing a hybrid vehicle according to a first embodiment.
Figure 2:
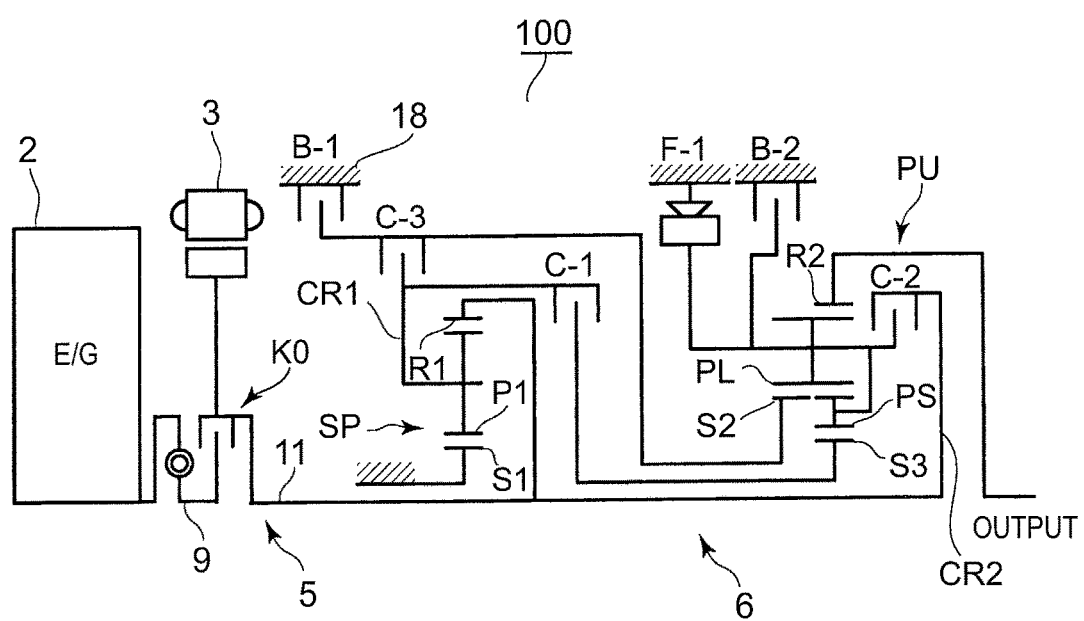
FIG. 2 is a skeleton diagram showing a hybrid drive device of the hybrid vehicle in FIG. 1.

As shown in FIGS. 1 and 2, a hybrid vehicle (hereinafter simply referred to as the "vehicle") 1 has a rotating electrical machine (hereinafter referred to as the "moor generator" or simply as the "motor") 3 in addition to an internal combustion engine 2 as a driving source. A hybrid drive device 100 as a vehicle drive device forming a power train of the vehicle 1 is a one-motor hybrid drive device, and has a speed change mechanism 6 provided on a transmission path between the internal combustion engine 2 and wheels 4, and an input portion 5 located between the speed change mechanism 6 and the internal combustion engine 2.

As shown in FIG. 2, the speed change mechanism 6 has a plurality of engagement elements (more specifically, a plurality of friction engagement elements) C-1 to C-3, B-1, B-2, and F-1, and is formed by a multi-stage automatic transmission (stepped automatic transmission) that attain a plurality of shift speeds by changing transmission paths of shift gear mechanisms SP, PU by engaging (in the present embodiment, changing the engagement/disengagement states of) the plurality of engagement elements.

The input portion 5 has the motor 3 and an engine connection clutch K0. The engine connection clutch K0 permits and cuts off power transmission between an engine coupling shaft 9 that is drivingly coupled to a crankshaft of the engine 2 and an input shaft 11 of the speed change mechanism 6. Moreover, the motor 3 is provided on the input side of the speed change mechanism 6 (the opposite side from the site drivingly coupled to the driving wheels 4 on the power transmission path), and is drivingly coupled to the input shaft 11 of the speed change mechanism 6.

Accordingly, in the case of driving both the internal combustion engine 2 and the motor 3 to move the vehicle, the hybrid drive device 100 controls a hydraulic control device 12 by a control unit (ECU, control device) 10 to engage the clutch K0. In an EV drive mode in which vehicle travels only by the driving force of the motor 3 drivingly coupled to the transmission path on the wheel side, the hybrid drive device 100 disengages the clutch K0 to cut off the transmission path on the internal combustion engine 2 side from the transmission path on the wheel side.

Sensors such as an input shaft rotational speed sensor 13 that detects the rotational speed of the input shaft 11 of the speed change mechanism 6 which makes the same rotation as that of the motor 3, a vehicle speed sensor 15 that detects the rotational speed of an output shaft 14 of the speed change mechanism 6, an accelerator operation amount sensor 16, and a brake sensor 17 are connected to the control unit 10 so that the sensors can communicate with the control unit 10. Based on the accelerator operation amount detected by the accelerator operation amount sensor 16, the brake operation amount detected by the brake sensor 17, and the rotational speed of the output shaft 14 (the vehicle speed) detected by the vehicle speed sensor 15, the control unit 10 controls the hydraulic control device 12 to engage or disengage the friction engagement elements C-1 to C-3, B-1, and B-2 of the speed change mechanism 6, thereby switching the shift speed of the speed change mechanism 6.

<Configuration of Speed Change Mechanism>

A specific configuration of the speed change mechanism 6 will be described below. As shown in FIG. 2, the speed change mechanism 6 is provided with a planetary gear SP and a planetary gear unit PU on the input shaft 11. The planetary gear SP is a so-called single-pinion planetary gear that includes a sun gear S1, a carrier CR1, and a ring gear R1, and that has on the carrier CR1 a pinion P1 meshing with the sun gear S1 and the ring gear R1.

The planetary gear unit PU is a so-called Ravigneaux type planetary gear that has a sun gear S2, a sun gear S3, a carrier CR2, and a ring gear R2 as four rotary elements, and that has on the carrier CR2 a long pinion PL meshing with the sun gear S2 and the ring gear R2 and a short pinion PS meshing with the sun gear 53 such that the long pinion PL meshes with the short pinion PS.

The sun gear S1 of the planetary gear SP is fixed to a transmission case 18, and the ring gear R1 is drivingly coupled to the input shaft 11 to make the same rotation (hereinafter referred to as the "input rotation") as that of the input shaft 11. Moreover, the carrier CR1 makes decelerated rotation, which is rotation decelerated from the input rotation, by the fixed sun gear S1 and the ring gear R1 making the input rotation, and is connected to the clutch C-1 and the clutch C-3.

The sun gear 52 of the planetary gear unit PU is connected to the brake B-1, so that the sun gear S2 can be fixed to the transmission case 18. The sun gear S2 of the planetary gear unit PU is also connected to the clutch C-3, so that the sun gear S2 can receive the decelerated rotation of the carrier CR1 via the clutch C-3. The sun gear S3 is connected to the clutch C-1, so that the sun gear S3 can receive the decelerated rotation of the carrier CR1.

Moreover, the carrier CR2 is connected to the clutch C-2 that receives the rotation of the input shaft 11, so that the carrier CR2 can receive the input rotation via the clutch C-2. The carrier CR2 is also connected to the one-way clutch F-1 and the brake B-2, so that rotation of the carrier CR2 in one direction with respect to the transmission case 18 is restricted via the one-way clutch F-1 and That the carrier CR2 can be held stationary via the brake B-2. The ring gear R2 is connected to a counter gear, and the counter gear is connected to the driving wheels 4 (see FIG. 1) via a countershaft and a differential unit.

The speed change mechanism 6 having the above configuration attains first (1st) to sixth (6th) forward speeds and a reverse speed (Rth) by engagement and disengagement of the clutches C-1 to C3, the brakes B-1, B-2, and the one-way clutch F-1 shown in the skeleton diagram of FIG. 2 according to the engagement table of FIG. 3, and changes the speed of the rotation received by the input shaft 11 at each shift speed to output the resultant rotation to the wheels 4.

<Background of Shifting in Regenerating State>

In the hybrid drive device 100 having the above motor 3 mounted thereon, it is desired to improve energy efficiency by converting kinetic energy to electrical energy as much as possible and collecting the electrical energy by regeneration by the motor 3. In this case, it is desirable to perform regeneration by the motor 3 in such a rotational speed range that achieves the highest regeneration efficiency, and it is desirable in terms of drivability to perform regeneration by the motor 3 on an equal power line. it is therefore desirable to perform regeneration by the motor 3 in a high rotation range.

Figure 4:
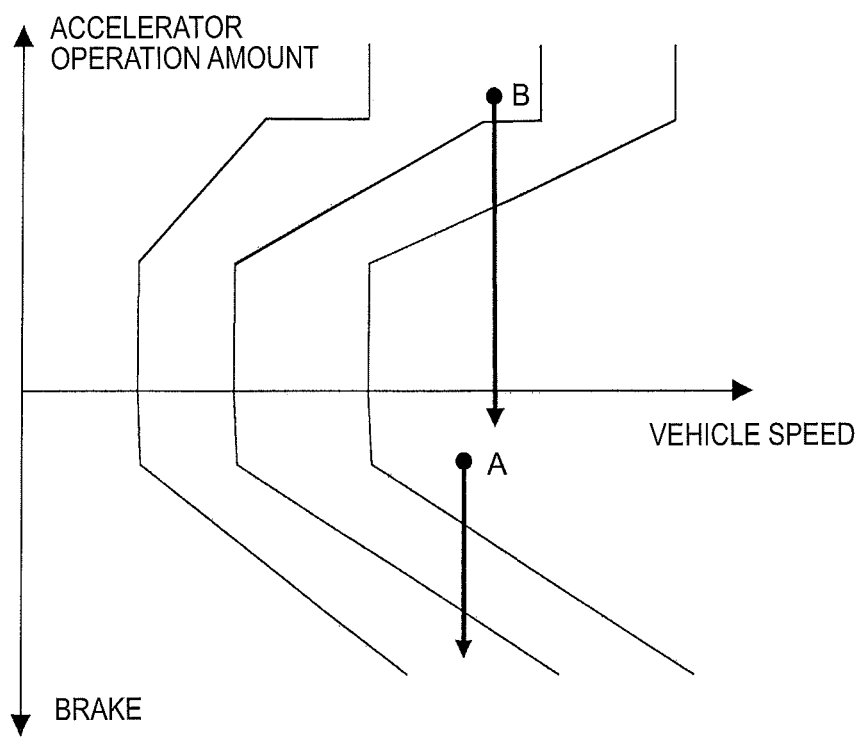
FIG. 4 is a shift map of the speed change mechanism of the hybrid drive device in FIG. 2.

Drag torque of the speed change mechanism 6 increases as the rotational speed of the input shaft 11 increases. As shown in FIG. 4, a shift map of the speed change mechanism 6 having the motor 3 provided on the input side is therefore set such that a target shift speed changes according to whether there is a regeneration request or not. That is, a shift point is set such that if there is no regeneration request, a high gear speed is selected so that the input shaft 11 makes low rotation, and if there is a regeneration request, a low gear speed is selected so that the input shaft 11 makes high rotation.

Accordingly, if a brake pedal is depressed more and the level of regeneration request is increased accordingly, the speed change mechanism 6 may need to downshift to a shift speed that is multiple shift speeds lower than a current shift speed with regeneration being performed by the motor 3 in order to perform regeneration by the motor 3 in an efficient rotational speed range (see arrow A in FIG. 4). For upshifts as well, if there is a brake request when an accelerator pedal is released from a depressed state, the speed change mechanism 6 may need to upshift to a shift speed that is multiple shift speeds higher than a current shift speed with regeneration being performed by the motor 3, as shown by arrow B in the figure.

In each of a regenerative downshift as a downshift that is performed with regeneration being performed by the motor 3 and a regenerative upshift as an upshift that is performed with regeneration being performed by the motor 3, it is desired to change to a target shill speed in as few shifts as possible in order to improve regeneration efficiency and drivability, in the case the target shift speed after shifting is multiple shift speeds higher or lower than a current shift speed.

Accordingly, if a target shift speed after shifting is multiple shift speeds higher or lower than a current shift speed, a jumping shift can be performed which is shifting performed by skipping multiple shift speeds instead of changing the shift speed one by one. However, such a jumping shift has the following problem if performed in the regenerating state.

That is, in the case of performing shifting of the speed change mechanism 6 in the regenerating state where regeneration is performed by the motor (rotating electrical machine) 3 provided on the input side of the speed change mechanism 6, a braking force for the vehicle is ensured by a regeneration force of the motor 3. The control unit 10 therefore controls the speed change mechanism 6 so as to change the engagement/disengagement states of the friction engagement elements while maintaining the state where the regenerative braking force of the motor 3 can be transmitted.

Figure 5A:
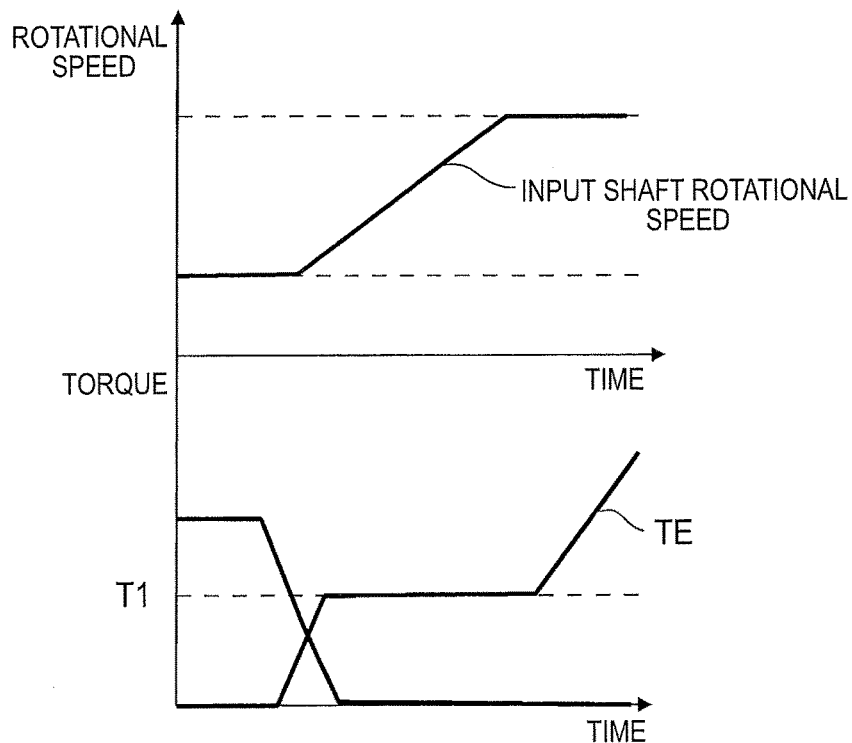
FIGS. 5A and 5B show graphs showing the relation between the torque of as friction engagement element and the rotational speed of an input shaft, where
Figure 5B:
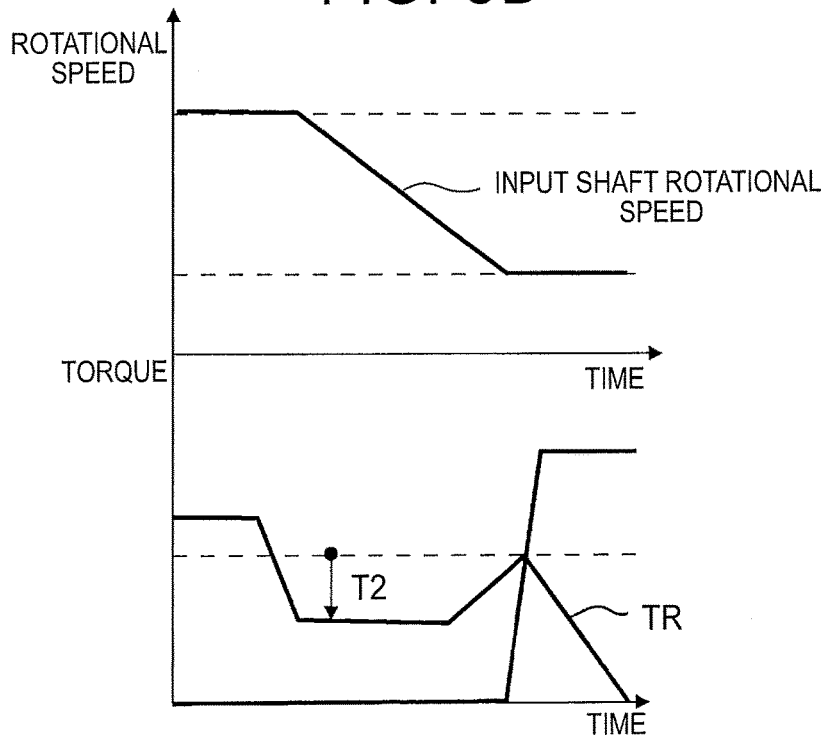

Specifically, as shown in FIG. 5A, a regenerative downshift is performed by increasing in an inertia phase the torque capacity of a friction engagement element to be engaged to a value T1 corresponding to the regenerative braking force. As shown in FIG. 5B, a regenerative upshift is performed while implementing a change in rotational speed by decreasing in an inertia phase the torque capacity TR of a friction engagement element to be disengaged in a range T2 in which interruption of regenerative braking is permitted.

As opposed to conventional vehicle drive devices that generate only at most negative torque corresponding to engine friction torque (vehicle drive devices having no motor), shifting with the motor 3 being in the regenerating state is thus performed under negative torque that is higher by negative torque of the motor 3 from regeneration. That is, in the case of the regenerative downshift, the torque capacity of the friction engagement element to be engaged in the inertia phase is higher than that in the conventional vehicle drive devices by the negative torque of the motor 3. In the regenerative upshift, the friction engagement element to be disengaged has a torque capacity corresponding to a breaking force in the inertia phase, as opposed to the conventional vehicle drive devices in which a friction engagement element to be disengaged has no torque capacity in the inertia phase.

A friction engagement element whose engagement/disengagement state is to be changed makes slip rotation in the state where the friction engagement element has a torque capacity corresponding to the regenerative braking force so that the regenerative braking force can be transmitted to the wheels 4. The amount of heat generation in the inertia phase is therefore increased.

A jumping shift requires a larger difference between the rotational speed of the input shaft 11 of the speed change mechanism 6 before shifting and that after shifting than a normal shift in which the shift speed is shifted one by one. The duration of the inertia phase is therefore longer in the jumping shift than in the normal shift, and the time required for the jumping shift is longer than that required for the normal shift. The increased amount of heat generation in the inertia phase together with the long duration of the inertia phase in the jumping shift results in a large amount of heat generation in a friction plate of the friction engagement element whose engagement/disengagement state is to be changed for shifting, which can cause an increase in temperature of the friction engagement element.

The control unit 10 according to the present embodiment therefore controls the speed change mechanism 6 during regenerative shifting so as to improve regeneration efficiency and drivability by preventing generation of an excessive thermal load on the friction engagement element whose engagement/disengagement state is to be changed, and reducing the number of shifts as much as possible to reduce shift loss in a torque phase. Operation of the control unit 10 in the regenerative shifting will he described below for a regenerative downshift and for a regenerative upshift.

<Regenerative Downshift>

Figures 6A, 6B:
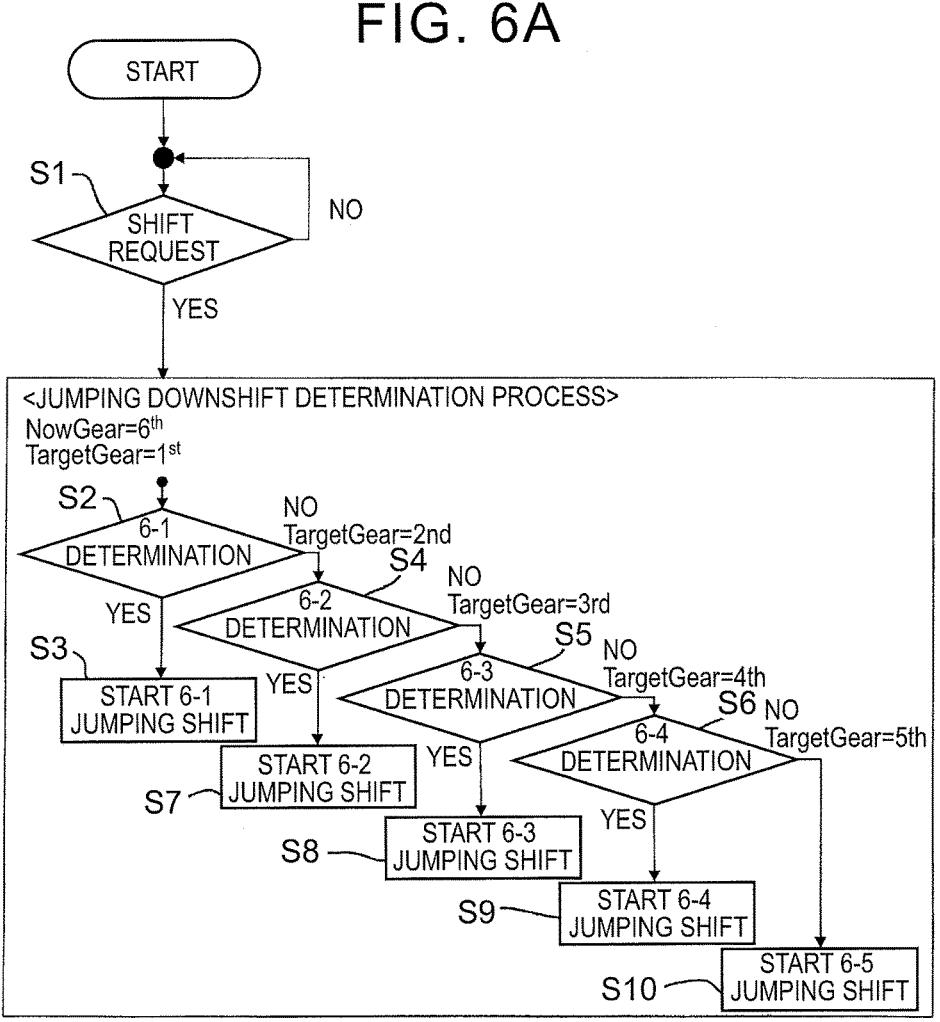
FIG. 6A is a flowchart showing a shift determination process for a jumping downshift in the case of changing the shift speed from a sixth speed to a first speed.
FIG. 6B shows a jumping downshift determination table showing jumping shifts to be determined when the jumping downshift is performed.

FIG. 6B is a jumping downshift determination table that is referred to by the control unit 10 for jumping downshift determination. All the possible patterns of jumping downshift that can be performed by the control unit 10 are recorded in the jumping downshift determination table.

The control unit 10 constantly determines whether every jumping downshift shown in the jumping downshift determination table can be permitted or not. Specifically, as shown in FIG. 7A, the control unit 10 calculates maximum rotation change acceleration that can be given to the input shaft 11 of the speed change mechanism 6 by the motor 3, based on maximum torque and maximum power that can be currently output from the motor 3) the rotational speed of the input shaft 11 after shifting, current motor torque, inertia of a rotary member on the input side of the friction engagement element (total inertia of rotary elements that are coupled to a drive system on the input side with respect to the friction engagement element).

That is, the control unit 10 functions as a maximum rotation change acceleration calculating unit 30 that calculates the maximum rotation change acceleration, and calculates motor torque that can be output from the motor 3 after shifting, based on the maximum motor power and the rotational speed after shifting. The control unit 10 obtains a value of maximum torque that can be output from the motor 3 by inverter control, and determines a smaller one of the motor torque calculated from the maximum motor power and the obtained maximum motor torque as torque that can be output from the motor 3 (i.e., a regenerative braking force).

The control unit 10 calculates maximum inertia torque that can be output from the motor 3, based on the torque that can be output from the motor 3 and the current motor torque. The control unit 10 divides the maximum inertia torque by the inertia of the rotary member on the input side with respect to the friction engagement element to calculate the maximum rotation change acceleration that can be given to the input shaft 11 of the speed change mechanism 6 by the motor 3.

Since the rotational speeds of the input shaft 11 before and after shifting is preset for each pattern of jumping shift, the control unit 10 can obtain the rotational speed difference of the input shaft 11 which is required to perform each jumping shift, that is, the difference between the rotational speed of the input shaft 11 of the speed change mechanism 6 before shifting and that and after shifting (differential rotation calculating unit 31). The control unit 10 functions as a required shift time calculating unit 32, and thus can calculate a shift time required to perform a jumping shift (duration of the inertia phase) by dividing the difference between the rotational speed of the speed change mechanism 6 before shifting and that after shifting by the maximum rotation change acceleration.

The control unit 10 also functions as a torque capacity calculating unit 33, and calculates the torque capacity of the friction engagement element by calculating input torque to the speed change mechanism to based on friction torque of the engine (only in the case where the engine is connected to a power transmission system) and drive torque of the motor, and multiplying the input torque to the speed change mechanism 6 by the distribution ratio of the friction engagement element.

Once the time required for shifting, the difference between the rotational speed of the speed change mechanism before shifting and that after shifting, and the torque capacity of the friction engagement element are obtained, the control unit 10 functions as a heat generation amount calculating unit 34, and thus can calculate the amount of heat generation of the friction engagement element to be engaged, based on the time required for shifting, the difference between the rotational speed of the input shaft 11 of the speed change mechanism before shifting and that after shifting, and the torque capacity of the friction engagement element.

Once the amount of heat generation of the friction engagement element can be obtained, the control unit 10 functions as a determining unit 36 that determines whether a jumping shift can be permitted or not. The control unit 10 determines whether or not the calculated amount of heat generation is equal to or less than a heat generation amount limit value that has been set for each friction engagement element (heat generation amount determining unit 37).

Once the required shift time is obtained, the control unit 10 determines whether or not the required shift time is equal to or less than a limit shift time that has been set to such a length that does not causes discomfort to the driver in view of drivability (shift time determining unit 38). The control unit 10 permits any jumping shift if the amount of heat generation of the friction engagement element is equal to or less than the heat generation amount limit value and the required shift time is equal to or less than the limit shift time. The control unit 10 does not permit any pattern of the jumping shift which fails to satisfy even one of the conditions for the heat generation and the shift time.

As shown in FIG. 6A, if them is a shift request for a regenerative downshift from the sixth speed as a current shift speed to the first speed as a target shift speed (YES in S1), the control unit 10 first refers to the shift determination result of whether a jumping shift from the sixth speed as the current shift speed directly to the first speed as the target shift speed can be performed or not (S2). If the 6-1 shift can be permitted (YES in S2), the control unit 10 performs the 6-1 shift (S3). If the 6-1 shift cannot be permitted (NO in S2), the control unit 10 determines whether there is any jumping shift that can be performed or not in order of 6-2 shift, 6-3 shift, and 6-4 shift such that the difference in shift speed in shifting from the current shift speed toward the target shift speed is reduced one by one (S4 to S6).

If any jumping shift that can be permitted is found by the determination, the control unit 10 performs this jumping shift (S7 to S9). Thereafter, the control unit 10 similarly searches for any jumping shift that can be permitted until the current shift speed becomes equal to the target shift speed, and thus performs shifting to the target shift speed (in the present embodiment, the first speed) in the minimum number of shifts. If there is no jumping shift that can be permitted, the control unit 10 downshifts the shift speed by one as usual (S10).

In FIG. 6B, in the case of determining whether a jumping shift can be permitted or not which is performed by changing the engagement/disengagement state of one friction engagement element forming the current shift speed (e.g., 6-2 shift), the control unit 10 calculates the amount of heat generation of the friction engagement element (e.g., the clutch C-1) that is caused to have a torque capacity corresponding to a regenerative braking force when changing the engagement disengagement state of the one friction engagement element. This jumping shift is permitted only if it is determined based on the calculated amount of heat generation and the calculated required time that the engagement/disengagement state of the friction engagement element can be changed.

In the case of a jumping shift that is performed by changing the engagement/disengagement states of both of two friction engagement elements forming the current shift speed as in a four-element switching shill (e.g., 6-1 shift), the control unit 10 calculates the amount of heat generation of each friction engagement element that is caused to have a torque capacity corresponding to a regenerative braking force when changing the engagement/disengagement state of each friction engagement element, that is, the amount of heat generation of each friction engagement element that transmits the regenerative braking force while making slip rotation during shifting (e.g., the clutch C-1 and the brake B-2; hereinafter also referred to as the active friction engagement element as the engagement element that causes a change in rotation of the input shaft 11 of the speed change mechanism 6). This jumping shift is permitted only if it is determined based on the calculated amounts of heat generation and the calculated required time that the engagement/disengagement states of both of the two friction engagement elements can be changed.

Based on the amount of heat generation of the friction engagement element or friction engagement elements which generate an increased amount of heat, the control unit 10 can thus reliably determine whether a shift can be permitted or not, and can also reliably determine whether a shift can be permitted or not even if the shift is a jumping shift that is performed by changing the engagement/disengagement states of both of two friction engagement elements forming a current shift speed.

Only the jumping shifts from the sixth speed are described above with reference to FIG. 6A. However, in the case where a jumping shift directly to the first speed as a target shift speed is not performed, the control unit 10 similarly determines whether there is any jumping shift that can be performed or not by reducing one by one the difference in shift speed from the current shift speed after the jumping shift toward the target shill speed, and performs the first jumping shift that can be permitted. The control unit 10 thus performs shifting until the current shift speed becomes equal to the target shift speed.

<Regenerative Upshift>

Figures 8A, 8B:
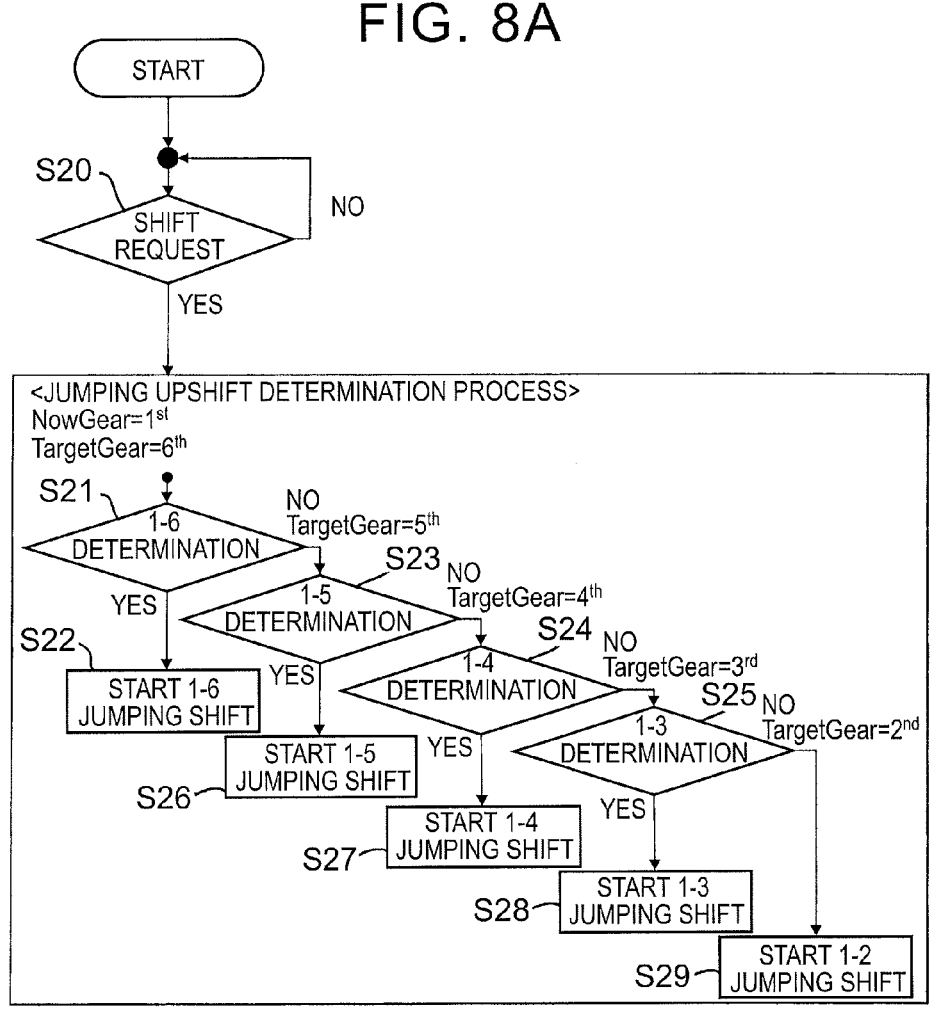
FIG. 8A is a flowchart showing a shift determination process for a jumping upshift in the case of changing the shift speed from the first speed to the sixth speed.
FIG. 8B shows a jumping upshift determination table showing jumping shifts to be determined when the jumping upshift is performed.

In the case of a regenerative upshift as well, the control unit 10 constantly determines whether every pattern of jumping shift shown in a jumping upshift determination table shown in FIG. 8B can be permitted or not, as in the case of the regenerative downshift.

As shown in FIG. 7B, a method for determining whether a jumping shift can be performed or not is basically similar to that in the case of the regenerative downshift. However, since this is an upshift, maximum inertia torque that can be output from the motor 3 is computed from minimum torque and minimum power of the motor. Specifically, since this is an upshift, the maximum inertia torque has a negative value, and maximum rotation change acceleration also has a negative value. The amount of heat generation is calculated for a friction engagement element to be disengaged.

For example, as shown in FIG. 8A, if there is a shift request for a regenerative upshift from the first speed as a current shift speed to the sixth speed as a target shift speed (YES in S20), the control unit 10 first refers to the shift determination result of whether a jumping shift from the first speed as the current shift speed directly to the sixth speed as the target shift speed can be performed or not (S21). If the 1-6 shift can be permitted (YES in S21), the control unit 10 performs the 1-6 shift (S22). If the 1-6 shift cannot be permitted (NO in S21), the control unit 10 determines whether there is any jumping shift that can be performed or not in order of 1-5 shift, 1-4 shift, and 1-3 shift such that the difference in shift speed in shifting from the current shift speed toward the target shift speed is reduced one by one (S23 to S25).

If any jumping shift that can be performed is found by the determination (YES in S23 to S25), the control unit 10 performs this jumping shift (S26 to S28). Thereafter, the control unit 10 similarly searches for any jumping shift that can be performed until the current shift speed becomes equal to the target shift speed, and thus performs shifting to the target shift speed (in the present embodiment, the sixth speed) in the minimum number of shifts, If there is no jumping shift that can be performed, the control unit 10 upshifts the shift speed by one as usual (S29).

As described above, the control unit 10 predicts and computes the amount of heat generation of the friction engagement element whose engagement/disengagement state is to be changed for shifting, based on performance of the motor (rotating electrical machine) 3 and a required regenerative braking force. Based on this amount of heat generation, the control unit 10 determines whether there is any jumping shift that can he permitted between the current shift speed and the target shift speed. If there is any jumping shift that can be performed, the control unit 10 performs this jumping shift and controls the speed change mechanism so as to change the shift speed from the current shift speed to the target shift speed. This allows the control unit 10 not to perform any jumping shift that cannot be permitted due to a large amount of beat generation of the friction engagement element, but to perform only a jumping shift with an acceptable amount of heat generation. This can prevent a thermal toad on the friction engagement element whose engagement/disengagement state is to be changed for shifting (i.e., the engagement element that has been engaged at the current shift speed and is to be disengaged at a shift speed after shifting, or the engagement element that has been disengaged at the current shift speed and is to be engaged at a shift speed after shifting; in other words, the engagement element whose amount of heat generation is predicted) from becoming excessive, and can reduce the number of shifts by performing as many jumping shifts as possible and can thus reduce energy loss during shifting. Moreover, since regeneration by the rotating electrical machine can be performed in an efficient rotational speed range at an early point in time, energy efficiency of the vehicle drive device can be improved.

If the time required for a jumping shift is longer than a predetermined shift limit value, the computed jumping shift is not permitted. This can prevent degradation in drivability due to a long shift time.

Moreover, in the case where multiple jumping shifts can be permitted, the jumping shift having the largest difference in shift speed is performed. Shifting to the target shift speed can thus be quickly achieved in a small number of shifts. Moreover, whether a jumping shift can be permitted or not is determined by reducing the difference in shift speed one by one from the difference in shift speed in the jumping shift in which the shift speed is shifted from the current shift speed directly to the target shift speed. It can therefore be reliably and easily determined that the first jumping shift that can be permitted is the jumping shift having the largest difference in shift speed.

The control unit 10 calculates the amount of heat generation of the friction engagement element that is caused to have a torque capacity corresponding to a regenerative braking force (in the case of an upshift, the friction engagement element to be disengaged; in the case of a downshift, the friction engagement element to be engaged) when changing the engagement/disengagement state of the friction engagement element, and determines whether a jumping shift can be permitted or not. Whether a shift can be permitted or not can therefore be reliably determined based on the amount of heat generation of the friction engagement element that generates a large amount of heat during shifting so as to have a torque capacity large enough to transmit the regenerative braking force.

<Second Embodiment>

A vehicle control device according to a second embodiment will be described with reference to FIGS. 9 to 11. The second embodiment is different from the first embodiment in that an estimated temperature of the friction engagement element during shifting is obtained, and whether a skip shift can be performed or not is determined based also on whether the estimated temperature is higher than an allowable temperature or not. Only the difference from the first embodiment will be described below, and description of similar portions will be omitted.

Figure 9:
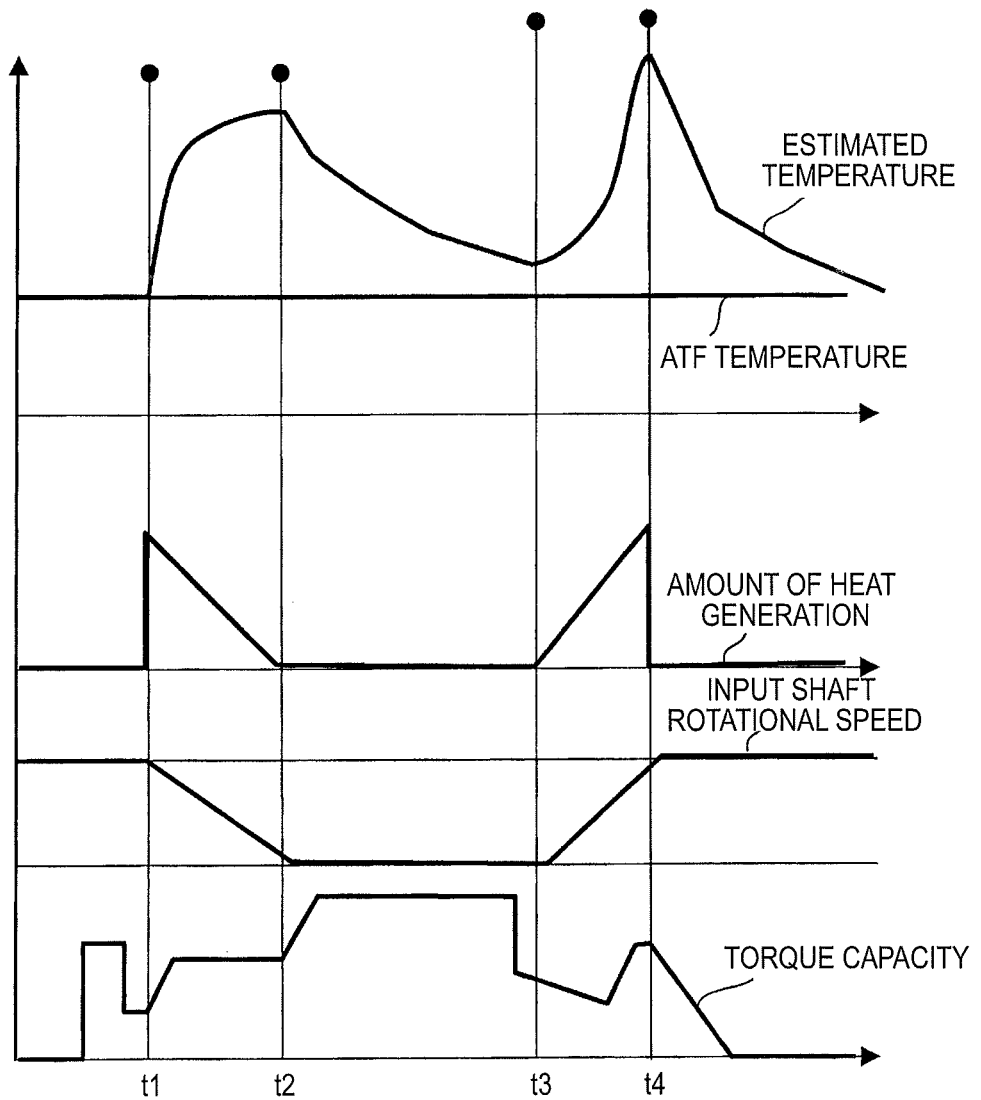
FIG. 9 is a graph showing how an estimated temperature of a friction engagement element changes during traveling of a vehicle.

FIG. 9 is a diagram showing how an estimated temperature of the active friction engagement element changes during traveling of the vehicle. FIG. 9 shows that the engagement/disengagement state of the active friction engagement element is changed between time t1 and t2 and between time t3 and t4, and that the active friction engagement element generates heat and increases in temperature during shifting as it makes slip rotation while transmitting a regenerative braking force. FIG. 9 also shows that between time t2 and t3 during which the engagement/disengagement state of the active friction engagement element is not changed, the temperature of the active friction engagement element decreases and reaches the temperature of hydraulic oil (hereinafter referred to as the "ATF") in the speed change mechanism 6.

At the start time t1 of the first shift, the temperature of the active friction engagement element is approximately the same as the ATF temperature. However, if the first shift and the second shift are performed at a relatively short time interval as in the case of FIG. 9, heat that generated during the first shift still remains at the start time t3 of the second shift. The temperature of the active friction engagement element at the start time t3 of the second shift is therefore higher than that at time t1.

Accordingly, even if the amount of heat generation of the active friction engagement element is the same in the first and second shifts, the temperature of the active friction engagement element can be either higher than the allowable temperature or equal to or lower than the allowable temperature during shifting depending on the temperature of the active friction engagement element at the shift start time.

That is, as shown in FIG. 10, even if a shift is performed in an exactly same manner, estimated temperatures X1, X3 of the active friction engagement element may be higher than the allowable temperature if the active friction engagement element has a high temperature at the start of the shift, and estimated temperatures X2, X4 of the active friction engagement element may not be higher than the allowable temperature if the active friction engagement element has a low temperature at the start of the shift.

Accordingly, in the present embodiment, whether a jumping shift can be performed or not is determined based also on the requirement for the estimated temperature of the friction engagement element during shifting in view of the current temperature of the active friction engagement element, in addition to the requirements for the amount of heat generation and the control time in the first embodiment. That is, as shown in FIG. 11, a control unit 10A according to the present embodiment functions as a current temperature calculating unit 40, and constantly calculates and estimates the current temperature of the active friction engagement element based on the heat balance (the sum of heat input and heat dissipation to and from the active friction engagement element, and the ATF temperature) accumulated up until a shift is performed.

Once the amount of heat generation of the active friction engagement element is calculated for shifting, the control unit 10A functions as an estimated temperature calculating unit 41, and obtains an estimated temperature of the active friction engagement element during shifting based on the current temperature of the active friction engagement element and the amount of heat generation of the active friction engagement element during shifting.

Once the estimated temperature of the active friction engagement element during shifting is obtained, the control unit 10A functioning as a temperature determining unit 42 and determines whether the estimated temperature is higher than the allowable temperature or not. In the present embodiment, a determining unit 36A that determines whether a jumping shift can be permitted or not includes the temperature determining unit 42, the heat generation amount determining section 37, and the shift time determining unit 38, and a jumping shift is permitted only if all of the requirements for the estimated temperature, the amount of heat generation, and the shift time are within the respective limit values.

According to the present embodiment, in addition to the amount of heat generation of the active friction engagement element during shifting, the current temperature of the active friction engagement element is also computed based on the heat balance accumulated up until a shift is performed. The estimated temperature of the active friction engagement element during shifting is calculated based on the amount of heat generation and the current temperature. If the estimated temperature of the active friction engagement element during shifting is equal to or lower than the allowable temperature, it is determined that the jumping shift can be permitted. If the estimated temperature of the active friction engagement element during shifting is higher than the allowable temperature, the jumping shift is not permitted. Whether a jumping shift can be performed or not can thus be more accurately determined.

<Third Embodiment>

In the second embodiment, whether a jumping shift can be performed or not is determined based on all of the requirement liter the amount of heat generation, the requirement for the estimated temperature, and the requirement for the shift time. However, whether a jumping shift can be performed or not can be determined based only on, e.g., the requirement for the amount of heat generation. Alternatively, whether a jumping shift can be performed or not can be determined based only on the requirement for the estimated temperature, or whether a jumping shift can be performed or not can be determined based only on the requirement for the amount of heat generation and the requirement for the estimated temperature.

In the first to third embodiments, a hybrid drive device is described as an example of the vehicle drive device. However, an engine is not necessarily required as a driving source, and the present embodiment is applicable to any vehicle drive device that includes a rotating electrical machine on the input side of the speed change mechanism. The speed change mechanism need not necessarily be a six-speed multi-stage automatic speed change mechanism, and can be any speed change mechanism having three or more shift speeds. Moreover, the speed change mechanism need not necessarily form a shift speed by engaging two friction engagement elements. For example, the speed change mechanism may be a speed change mechanism that forms a shift speed by engaging three or more friction engagement elements. In this case as well, as described above, whether a shift can be performed or not may be determined based on the amount of heat generation of the friction engagement element that has a torque capacity large enough to transmit a regenerative braking force during shifting. For example, whether a shift can be performed or not may be determined by calculating the amount of heat generation of two or more friction engagement elements.

In the present embodiment, as an example of the friction engagement element having a torque capacity enough to transmit a regenerative braking force during shifting, the engagement element to be disengaged is caused to have a torque capacity enough to transmit a regenerative braking force in the case of a regenerative upshift, and the engagement element to be engaged is caused to have a torque capacity enough to transmit a regenerative braking force in the case of a regenerative downshift. However, the present embodiment is not necessarily limited to this. That is, the engagement element to be engaged may be caused to have a torque capacity enough to transmit a regenerative braking force in the case of a regenerative upshift, and the engagement element to be disengaged may be caused to have such a torque capacity in the case of a regenerative downshift.

In other words, the control unit calculates the amount of heat generation of at least one friction engagement element whose amount of heat generation increases during shifting, namely the active engagement element that causes a change in rotation. This active engagement element can be designed to be either an engagement element to be disengaged or an engagement element to be engaged.

Moreover, the amount of heat generation of the active engagement element is obtained by calculating a required shift time etc. based on a regenerative braking force (i.e., negative torque that is generated by the motor). Alternatively, an energy calculation may be performed before and after shifting based on the regenerative of braking, force, and the amount of heat generation of the engagement element may be calculated from the balance obtained from the energy calculation.

In addition to a multi-plate clutch, the automatic transmission may use, e.g., a non-friction clutch such as a dog clinch as a part of the clutches and brakes, and may form multiple shift speeds by combining these engagement elements.

Moreover, in the above embodiments, whether a jumping shift from a current shift speed directly to a target shift speed can be permitted or not is first determined, and then whether a jumping shift can be permitted or not is determined by reducing the difference in shift speed between the current shift speed and the shift speed after the jumping shift one by one. However, whether a jumping shift can be permitted or not may be determined by increasing the difference in shift speed from the current shift speed one by one. In this case, the jumping shift that is immediately before the jumping shift that is not permitted has the largest difference in shift speed.

In the second and third embodiments, the current temperature, the estimated temperature, and the allowable temperature are calculated in the unit of temperature. However, the current temperature, the estimated temperature, and the allowable temperature may be calculated by conversion to the unit of the amount of heat generation by using the thermal capacity of the clutch. Similarly, in the first embodiment as well, the amount of beat generation and the heat generation amount limit value may be calculated in the unit of temperature etc. That is, in the present embodiment, the terms such as the "amount of heat generation" and the "temperature" may be expressed in any unit, and they are substantially the same.

The amount of heat generation of the friction engagement element may be calculated as a difference obtained by subtracting energy on the upstream side of the friction engagement element in power transmission and energy on the downstream side of the friction engagement element in power transmission from total energy in the power transmission system.

Moreover, the control unit 10 may not constantly determine whether a jumping shift can be performed or not by computing the amount of heat generation of the friction engagement element and the shift time, but may determine whether a jumping shift can be performed or not in response to a shift request by computing the amount of heat generation of the friction engagement element associated with the shift and the shift time. The control unit 10 may determine whether a shift can be performed or not based only on the calculated amount of heat generation of the friction engagement element. The embodiments described, above can be used in any combinations.

INDUSTRIAL APPLICABILITY

The hydraulic drive device for the automatic transmission according to preferred embodiments is preferably mounted on, e.g., automatic transmissions of devices including a rotating electrical machine such as hybrid vehicles and electric vehicles.

DESCRIPTION OF THE REFERENCE NUMERALS

3: Rotating Electrical Machine (Motor)
6: Speed Change Mechanism

10: Control Device (Control Unit)
100: Vehicle Drive Device (Hybrid Drive Device)
C-1 to C-3, B-1, B-2, F-1: Engagement Element: (Clutch, Brake)

The invention claimed is:

1. A control device for a vehicle drive device having an automatic transmission that attains a predetermined shift stage by engaging multiple engagement elements, the control device is configured to control the automatic transmission so that when performing shifting of the automatic transmission in a regenerating state where regeneration is performed by a rotating electrical machine provided on an input side of the automatic transmission, shifting of the automatic transmission is performed while maintaining a state where a regenerative braking force of the rotating electrical machine can be transmitted; and
when the shifting of the automatic transmission is to be performed in the regenerating state, and a target shift stage after the shifting is multiple shift stages higher or lower than a current shift stage, the control device is configured to:
predict an amount of heat generation of the engagement element that has been engaged at the current shift stage and is to be disengaged at the shift stage after the shifting or the engagement element that has been disengaged at the current shift stage and is to be engaged at the shift stage after the shifting, wherein the amount of heat generation is predicted based on the regenerative braking force,
determine based on the amount of heat generation whether any jumping shift from the current shift stage to the shift stage that is the multiple shift stages higher or lower than the current shift stage can be permitted or not between the current shift stage and the target shift stage, and
if the jumping shift can be permitted, the control unit is configured to perform the jumping shift and control the automatic transmission so as to shift the shift stage from the current shift stage to the target shift stage,
wherein the control device is configured to calculate a maximum acceleration change that can be provided to the automatic transmission by the rotating electrical machine, and is configured to obtain a time required for the shifting from the maximum acceleration change and a difference between a rotational speed of the automatic transmission before the shifting and that after the shifting, and if the required time is longer than a predetermined time, the control device is configured to not permit the jumping shift.

2. The control device for the vehicle drive device according to claim 1, wherein
if the amount of heat generation is equal to or smaller than a heat generation amount limit value that has been set for each engagement element, the control device determines that the jumping shift can be permitted, and if the amount of heat generation is larger than the heat generation amount limit value, the control device does not permit the jumping shift.

3. The control device for the vehicle drive device according to claim 1, wherein
the control device is configured to compute, based on a heat balance accumulated up until the shifting is performed, a current temperature of the engagement element whose amount of heat generation is predicted, and is configured to obtain based on the computed current temperature and the amount of heat generation, an estimated temperature during shifting of the engagement element whose amount of heat generation is predicted, and
if the estimated temperature is equal to or lower than an allowable temperature that has been set for each engagement element, the control device is configured to determine that the jumping shift can be permitted, and if the estimated temperature is higher than the allowable temperature, the control device does not permit the jumping shift.

4. The control device for the vehicle drive device according to claim 1, wherein
if there are a plurality of the jumping shifts that can be permitted, the control device is configured to perform the jumping shift having a largest difference in shift stage between the current shift stage and a shift stage after jumping.

5. The control device for the vehicle drive device according to claim 4, wherein
when determining whether the jumping shifts can be permitted or not, the control device is configured to first determine whether jumping shift from the current shift stage directly to the target shift stage can be permitted or not, and then determine whether the jumping shifts can be permitted or not by reducing a difference in shift stage between the current shift stage and a shift stage after the jumping shift one by one, and a first jumping shift determined to be able to be permitted is a jumping shift having the largest difference in shift stage between the current shift stage and the shift stage after the jumping shift.

6. The control device for the vehicle drive device according to claim 1, wherein
if the jumping shift is a jumping shift that is performed by changing an engagement/disengagement state of one engagement element forming the current shift stage, the control device is configured to calculate the amount of heat generation of the engagement element that is caused to have a torque capacity corresponding to the regenerative braking force when the engagement/disengagement state of the one engagement element is changed, and permits the jumping shift if it can be determined from the calculated amount of heat generation that the engagement/disengagement state of the one engagement element can be changed.

7. The control device for the vehicle drive device according to claim 6, wherein
if the jumping shift is an upshift, the engagement element that is caused to have the torque capacity corresponding to the regenerative braking force is disengaged, and if the jumping shift is a downshift, the engagement element that is caused to have the torque capacity corresponding to the regenerative braking force is engaged.

8. The control device for the vehicle drive device according to claim 1, wherein
if the jumping shift is a jumping shift that is performed by changing the engagement/disengagement states of both of two engagement elements forming the current shift stage, the control device is configured to calculate the amount of heat generation of each engagement element that is caused to have the torque capacity corresponding to the regenerative braking force when the engagement/disengagement state of each of the two engagement elements is changed, and permits the jumping shift if it can be determined from the calculated amounts of heat generation that the engagement/disengagement states of both of the two engagement elements can be changed.

9. The control device for the vehicle drive device according to claim 1, wherein
the control device calculates the amount of heat generation based on the time required for the shifting, the difference between the rotational speed of the automatic transmission before the shifting and a speed after the shifting, and a torque capacity of the engagement element.

\* \* \* \* \*